United States Patent
Levenson et al.

(10) Patent No.: US 6,661,957 B1
(45) Date of Patent: Dec. 9, 2003

(54) DIFFUSION BARRIERS FOR HOLEY FIBERS

(76) Inventors: Marc David Levenson, 19868 Bonnie Ridge Way, Saratoga, CA (US) 95070; Rodney Trevor Hodgson, 822 Pinesbridge Rd., Ossining, NY (US) 10562

( * ) Notice: Subject to any disclaimer, the term of this patent is extended or adjusted under 35 U.S.C. 154(b) by 0 days.

(21) Appl. No.: 10/317,744

(22) Filed: Dec. 12, 2002

Related U.S. Application Data

(63) Continuation-in-part of application No. 09/907,241, filed on Jul. 17, 2001, now Pat. No. 6,496,634.

(51) Int. Cl.[7] .............................. G02B 6/02; G02B 6/20
(52) U.S. Cl. ..................... 385/125; 385/27; 359/334; 359/341.1
(58) Field of Search ................ 385/125, 27; 359/341.1, 359/341.3, 342, 334

(56) References Cited

U.S. PATENT DOCUMENTS

2001/0046357 A1 * 11/2001 Hordvik ................... 385/102
2002/0118937 A1 * 8/2002 Broderick ................ 385/125
2002/0118938 A1 * 8/2002 Hasegawa ................ 385/125
2002/0168161 A1 * 11/2002 Price ....................... 385/123

OTHER PUBLICATIONS

J.H.Lee, et al., "A Holey fibre Raman amplifier and all–optical modulator", ECOC 2001, pp. 46–47, Sep. 2001.*

D.J.Richardson, et al., Holey fibers; fundamentals and applications , CLEO 2002, pp. 453–454.*

Z.Yusoff, et al., "Raman effects in a highly nonlinear holey fiber: amplification and modulation", Optics Letters, 27(6), pp. 424–426, Mar. 2002.*

* cited by examiner

*Primary Examiner*—John Juba
*Assistant Examiner*—Leo Boutsikaris
(74) *Attorney, Agent, or Firm*—Rodney T Hodgson

(57) ABSTRACT

A diffusion barrier attached to the cladding layer prevents significant diffusion of a Raman active gas out of the holes in a holey fiber or photonic band gap fiber.

15 Claims, 1 Drawing Sheet

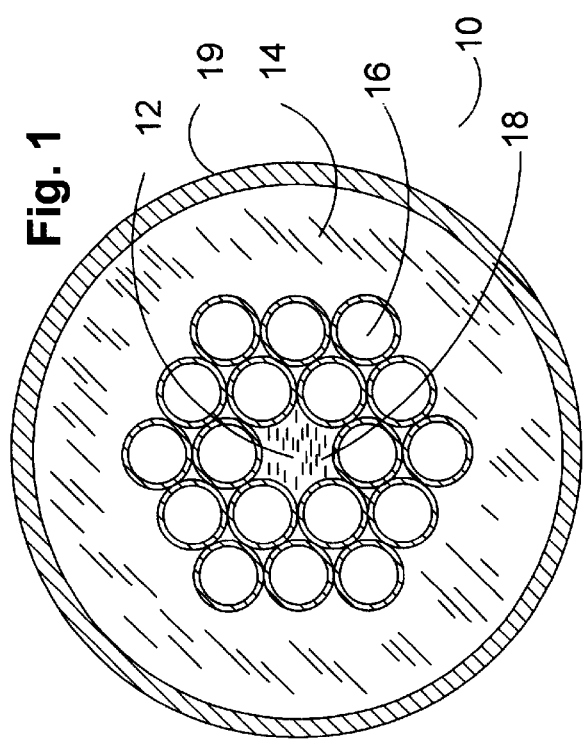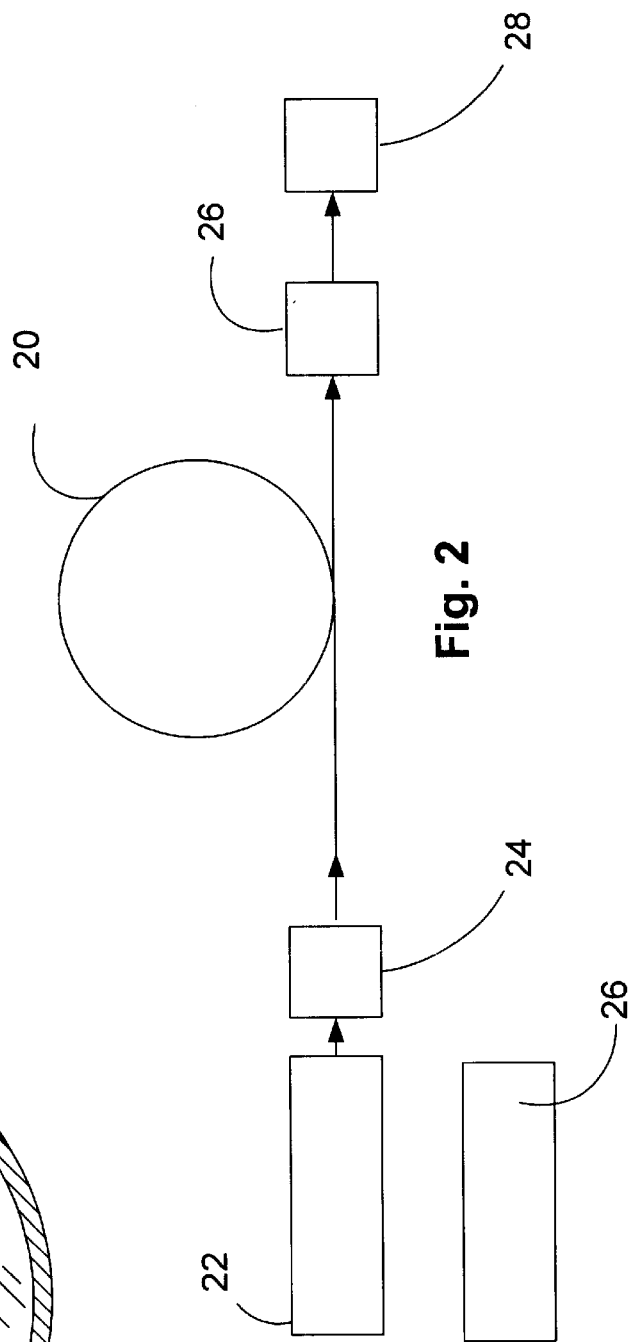

DIFFUSION BARRIERS FOR HOLEY FIBERS

CROSS REFERENCE TO RELATED APPLICATIONS

This application is a continuation-in-part (CIP) of copending U.S. application Ser. No. 09/907,241 filed Jul. 17, 2001 (now U.S. Pat. No. 6,496,634 issued Dec. 17, 2002), the above application being incorporated herein by reference in its entirety including incorporated material.

FIELD OF THE INVENTION

The field of the invention is the field of optical fibers.

BRIEF DESCRIPTION OF THE DRAWINGS

FIG. 1 shows a sketch of a cross section of the optical fiber of the invention.

FIG. 2 shows a sketch of the system of the invention.

DETAILED DESCRIPTION OF THE INVENTION

Copending U.S. application Ser. No. 09/907,241 filed Jul. 17, 2001 (now U.S. Pat. No. 6,496,634 issued Dec. 17, 2002), includes a detailed description of an optical fiber having fluid filled holes for Raman amplification of light. FIG. 1 shows a sketch of a cross section of the optical fiber 10 of the invention. The fiber 10 comprises a core region 12 and a cladding region 14 surrounding the core region. The core region contains a plurality of holes 16 elongated in the axial direction of the fiber. The center region and/or the holes 16 contain a Raman active fluid material 18. Such Raman active fluids include but are not limited to: hydrogen containing gases such as molecular hydrogen and methane; deuterium containing gases such as molecular deuterium and deuterated methane; and halogen containing gases such as tetrafluoromethane. The improvement of the present invention over U.S. application Ser. No. 09/907,241 comprises a diffusion barrier material 19 which prevents the Raman active material 18 from diff-using out of the fiber.

Optical fibers will have a useful life measured in decades, and the material of the cladding 14 is usually fused silica. Fused silica has a relatively open structure which allows diffusion of material such as hydrogen. Such diffusion of the Raman active material 18 will necessarily reduce the Raman gain if the fluid pressure in the fiber changes. Materials for a diffusion barrier 19 such as non metallic materials silicon nitride and borosilicate glass, or metals such as aluminum allow much less diffusion, so that the time for significant diffusion of hydrogen out of the core of the fiber will be lengthened. For purposes of this specification, significant diffusion has occurred when the pressure of the Raman active material 18 drops sufficiently to significantly reduce the Raman gain in the fiber. FIG. 1 shows the diffusion barrier material surrounding the cladding material, but the diffusion barrier may be part of the cladding layer or between the cladding material and the core.

FIG. 2 shows a sketch of the system of the invention. Light output from one or more lasers or other sources of light 22 is introduced into the fiber of the invention 20 by an optical apparatus 24 as is known in the art. Optical apparatus 26 is used to conduct light from the fiber 20 to detectors, signal splitters, demodulators, etc 28 as are known in the art. Control apparatus 26 controls the light generator 22 and optical apparatus 24.

Obviously, many modifications and variations of the present invention are possible in light of the above teachings. It is therefore to be understood that, within the scope of the appended claims, the invention may be practiced otherwise than as specifically described.

We claim:

1. An apparatus, comprising;
   an optical fiber having an axis, the optical fiber comprising a solid outer cladding region and a core region, the cladding region surrounding the core region, wherein the core region contains a plurality of holes elongated in the direction of the axis, and wherein at least one hole contains a Raman amplifying gas; and
   a diffusion barrier attached to the cladding layer, the diffusion barrier preventing significant diffusion of the Raman active gas out of the holes.

2. The apparatus of claim 1, where the Raman active gas is a hydrogen containing molecular gas.

3. The apparatus of claim 2, where the Raman active gas is hydrogen.

4. The apparatus of claim 2, where the Raman active gas is methane.

5. The apparatus of claim 1, where the Raman active gas is a deuterium containing molecular gas.

6. The apparatus of claim 5, where the Raman active gas is deuterium.

7. The apparatus of claim 5, where the Raman active gas is deuterated methane.

8. The apparatus of claim 1, where the Raman active gas is a halogen containing molecular gas.

9. The apparatus of claim 8, where the Raman active gas is tetrafluoromethane.

10. The apparatus of claim 1, where the diffusion barrier comprises a non-metallic diffusion barrier.

11. The apparatus of claim 10, where the diffusion barrier comprises silicon nitride.

12. The apparatus of claim 10, where the diffusion barrier comprises borosilicate glass.

13. The apparatus of claim 1, where the diffusion barrier comprises a metal.

14. The apparatus of claim 1, where the diffusion barrier comprises aluminum.

15. A system, comprising;
   an optical fiber having an axis, the optical fiber comprising a solid outer cladding region and a core region, the cladding region surrounding the core region, wherein the core region contains a plurality of holes elongated in the direction of the axis, and wherein at least one hole contains a Raman amplifying gas; and wherein a diffusion barrier is attached to the cladding layer, the diffusion barrier preventing significant diffusion of the Raman active gas out of the holes;
   optical apparatus for introducing light into the fiber;
   optical apparatus for removing light from the fiber;
   an apparatus for introducing Raman pump light into the fiber; and
   control means for controlling the apparatus for introducing Raman pump light into the fiber.

* * * * *